United States Patent
Bean et al.

(10) Patent No.: US 12,160,634 B2
(45) Date of Patent: Dec. 3, 2024

(54) AUTOMATED VISUAL TRIGGER PROFILING AND DETECTION

(71) Applicants: SONY INTERACTIVE ENTERTAINMENT LLC, San Mateo, CA (US); SONY INTERACTIVE ENTERTAINMENT INC., Tokyo (JP)

(72) Inventors: Celeste Bean, San Mateo, CA (US); Kristie Ramirez, San Mateo, CA (US); Elizabeth Juenger, San Mateo, CA (US); Steve Osman, San Mateo, CA (US); Olga Rudi, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/828,775

(22) Filed: May 31, 2022

(65) Prior Publication Data
US 2023/0388584 A1    Nov. 30, 2023

(51) Int. Cl.
*H04N 21/442* (2011.01)
*H04N 21/44* (2011.01)
(Continued)

(52) U.S. Cl.
CPC . *H04N 21/44204* (2013.01); *H04N 21/44004* (2013.01); *H04N 21/4532* (2013.01); *H04N 21/4755* (2013.01)

(58) Field of Classification Search
CPC ....... H04N 21/44204; H04N 21/44004; H04N 21/4532; H04N 21/4755
See application file for complete search history.

(56) References Cited

U.S. PATENT DOCUMENTS

2011/0185437 A1*  7/2011  Tran ............... H04L 63/104 726/28
2018/0176641 A1*  6/2018  Yun ............... H04N 21/84
(Continued)

FOREIGN PATENT DOCUMENTS

WO  PCT/US2023/020727    5/2023
WO  WO 2023/235092      12/2023

OTHER PUBLICATIONS

International Search Report and Written Opinion issued for corresponding PCT Application No. PCT/US2023/020727 on May 30, 2023.

*Primary Examiner* — John W Miller
*Assistant Examiner* — Akshay Doshi
(74) *Attorney, Agent, or Firm* — Polsinelli LLP

(57) ABSTRACT

Systems and methods for automated visual trigger profiling and detection within virtual environments are provided. A visual trigger profile may be stored in memory that includes a set of visual trigger characteristics associated with a type of visual sensitivity. Buffered frames of an audiovisual stream that have not yet been displayed may be monitored to identify when a buffered frame includes a threshold level of the visual trigger characteristics associated with the visual sensitivity. A frame modification that decreases the level of the detected visual trigger characteristics associated with the visual sensitivity may be identified and applied to the identified frames. The modified frames may thereafter be presented during the audiovisual stream in place of the original (unmodified) identified frames.

23 Claims, 6 Drawing Sheets

(51) Int. Cl.
*H04N 21/45* (2011.01)
*H04N 21/475* (2011.01)

(56) References Cited

U.S. PATENT DOCUMENTS

| | | | | |
|---|---|---|---|---|
| 2018/0310042 | A1* | 10/2018 | Mayalil | H04N 21/41407 |
| 2019/0057187 | A1* | 2/2019 | Head | G06F 3/015 |
| 2020/0234499 | A1* | 7/2020 | Hwang | G06T 19/006 |
| 2020/0275158 | A1* | 8/2020 | Gaur | H04N 21/26603 |
| 2020/0366959 | A1* | 11/2020 | Pau | G11B 27/28 |
| 2021/0097287 | A1* | 4/2021 | Stelmar Netto | G06F 18/22 |
| 2021/0346806 | A1* | 11/2021 | Pardeshi | G06N 3/045 |

* cited by examiner

AUTOMATED VISUAL TRIGGER PROFILING AND DETECTION

BACKGROUND OF THE INVENTION

1. Field of the Invention

The present invention generally relates to detection of visual triggers within virtual environments. More specifically, the present invention relates to automated visual trigger profiling and detection within virtual environments.

2. Description of the Related Art

Presently available digital content may include audiovisual and other types of data presented in association with a virtual environment. An interactive session allows a user to interact with such digital content (e.g., interactive game titles and other content titles) by generating and displaying associated virtual environments and virtual characters and objects therein. Some users are particularly sensitive, however, to certain types of visual stimuli, which may result in seizures, migraines, nausea, dizziness, eye strain or pain, vertigo, fatigue, anxiety, depression, post-traumatic stress disorder (PTSD), and/or other undesirable physical, physiological, mental, or emotional effects. For example, bright or flashing/strobe lights, high color contrasts, and certain visual patterns associated with pattern glare (e.g., striped, geometric) are associated with triggering seizures and migraines.

While some content developers and distributors may include warnings, different users may have different types of visual sensitivity, as well as different tolerances and reactions in relation to different levels of visual stimulation. Moreover, because some of the reactions may be quite painful and/or debilitating over time, users may be reluctant to try or experience new audiovisual content unless and until they can be assured as to the levels of risk related to their visual sensitivities. Further, there are presently no effective ways in which to address such visual sensitivities known to exist in the virtual environments of certain content titles other than partial or wholescale avoidance. While display settings can be selected to minimize certain visual characteristics (e.g., brightness, contrast levels), such settings may interfere with interactive activities and enjoyment of the same in relation to less risky portions of the virtual environment. For example, while darkness or minimal color may avoid certain visual triggers, they may also prevent a user from successfully navigating within the virtual environment, as well as prevent the user from fully experiencing the visual beauty or artistry of the virtual environment.

There is, therefore, a need in the art for improved systems and methods of automated visual trigger profiling and detection within virtual environments.

SUMMARY OF THE CLAIMED INVENTION

Embodiments of the present invention include systems and methods for automated visual trigger profiling and detection within virtual environments. A visual trigger profile may be stored in memory that includes a set of visual trigger characteristics associated with a type of visual sensitivity. Buffered frames of an audiovisual stream that have not yet been displayed may be monitored to identify when a buffered frame includes a threshold level of the visual trigger characteristics associated with the visual sensitivity. A frame modification that decreases the level of the detected visual trigger characteristics associated with the visual sensitivity may be identified and applied to the identified frames. The modified frames may thereafter be presented during the audiovisual stream in place of the original (unmodified) identified frames.

DETAILED DESCRIPTION

Embodiments of the present invention include systems and methods for automated visual trigger profiling and detection within virtual environments. A visual trigger profile may be stored in memory that includes a set of visual trigger characteristics associated with a type of visual sensitivity. Buffered frames of an audiovisual stream that have not yet been displayed may be monitored to identify when a buffered frame includes a threshold level of the visual trigger characteristics associated with the visual sensitivity. A frame modification that decreases the level of the detected visual trigger characteristics associated with the visual sensitivity may be identified and applied to the identified frames. The modified frames may thereafter be presented during the audiovisual stream in place of the original (unmodified) identified frames.

Figure 1:
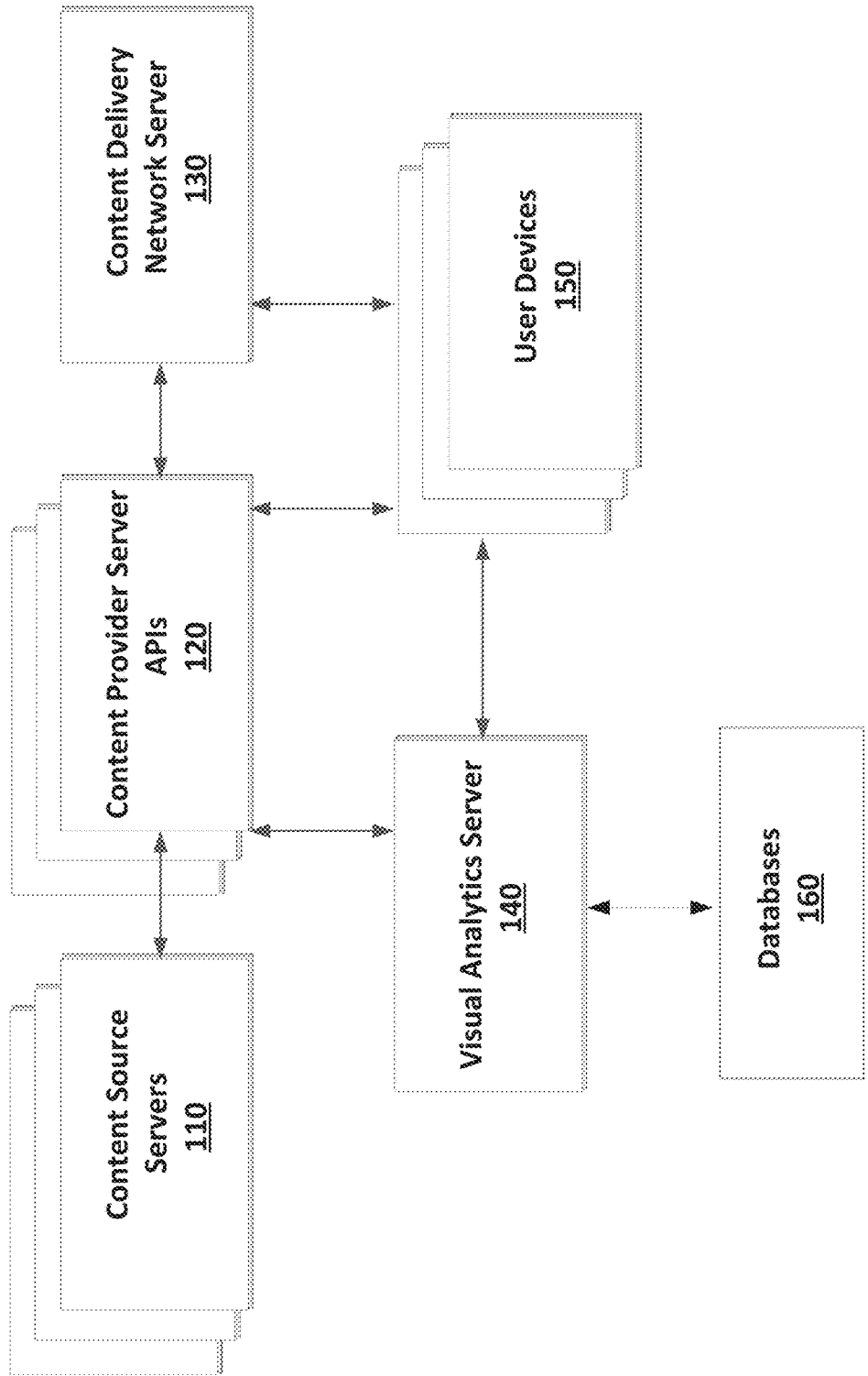
FIG. 1 illustrates a network environment in which a system for automated visual trigger profiling and detection within virtual environments may be implemented.

FIG. 1 illustrates a network environment in which a system for automated visual trigger profiling and detection within virtual environments may be implemented. The network environment 100 may include one or more content source servers 110 that provide digital content (e.g., games, other applications and services) for distribution, one or more content provider server application program interfaces (APIs) 120, content delivery network server 130, visual analytics server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different content titles, which may further have be associated with object data regarding a digital or virtual object (e.g., activity information, zone information, character information, player information, other game media information, etc.) displayed in a digital or virtual environment during an interactive session.

Such content may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent with one or more communication sessions, and the gameplay and communication sessions may be hosted on one or more of the content source servers 110.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, visual analytics server 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

Visual analytics server 140 may include any data server known in the art that is capable of communicating with the different content source servers 110, content provider server APIs 120, content delivery network server 130, user devices 150, and databases 160. Such visual analytics server 140 may be implemented on one or more cloud servers that carry out instructions associated with interactive content (e.g., games, activities, video, podcasts, User Generated Content ("UGC"), publisher content, etc.). While illustrated separately, visual analytics server 140 may be part of one of the other illustrated devices of FIG. 1, and the functions of cooperative control server 140 may be provided as a service in accordance with instructions embodied in any combination of remote, cloud-based, or local applications that have been specially configured and arranged to provide the service to a specific user or set of users of user devices 150.

The visual analytics servers 140 may carry out instructions, for example, for monitoring one or more incoming audiovisual streams to one or more display devices and/or other output devices. As an audiovisual stream is provided to a user device 150, one or more incoming video frames may be rendered as part of background processing and buffered in a buffer memory before being provided to a display device for display. The visual analytics server 140 may monitor the buffered frames of the incoming audiovisual stream in view of one or more stored visual trigger profiles. Each visual trigger profile may be associated with a specific type of visual sensitivity (e.g., seizures) and may include information regarding a set of visual characteristics (e.g., bright, flashing lights, high contrast patterns) associated with the specific visual sensitivity type. There may be multiple different visual trigger profiles for different types of visual sensitivities, and each of the visual trigger profiles may further specify different threshold levels associated with different types of visual characteristics. A visual trigger profile may further be customized to specific users, which may include adjusting the threshold level, the visual trigger characteristics in the set, or one or more preferences for frame modification. Visual trigger profile—including highly customized visual trigger profiles—may be packaged (e.g., patches), shared, and/or transmitted to different user devices associated with users having similar conditions or concerns in relation to visual triggers presented within virtual environments.

Using the visual trigger profiles applicable to a user, visual analytics server 140 may analyze upcoming frames (buffered but not yet displayed) and detect when any of the upcoming frames may exhibit the visual characteristics associated with a visual trigger. Such analysis may include analysis of each frame, in whole or in part (e.g., specific pixels, groups of pixels, portions of a frame), as well as groups of consecutive frames. Visual triggers may be analyzed and characterized, for example, by reference to specific ranges or levels of color contrast and other measurable differentials. When a frame (or portion or grouping thereof) is determined to meet a threshold level of visual characteristics, the visual analytics server 140 identify the frame(s) as including a visual trigger, whereupon the visual analytics server 140 may identify a modification to apply to the identified frame(s). Information regarding associated modifications may also be part of the visual trigger profile. Each modification may be inclusive of instructions executable to modify and decrease the levels of visual characteristics associated with the visual trigger, thereby minimizing risk of an adverse reaction to the same. In exemplary implementations, the modification(s) may only be applied to the identified frame(s) (or portions thereof) determined to have the threshold level of visual characteristics associated with the visual trigger. Such modifications may include any combination of a color filter, contrast filter, color conversion, censor bar, substitute image, and frozen image.

Modifications may also be customized to the specific user, who specify a particular substitute image or type of substitute images to use in place of visual triggers. In some embodiments, a modification may be associated with a notification provided to the user in order to convey that the original image or portion thereof has been modified based on likelihood of triggering adverse reactions in those having visual sensitivity. Notifications may include a warning, description of the type of risk, description of the original frame image or video, description of the modification, and other explanatory and contextual data regarding the modified frame(s).

The visual analytics server 140 may identify a frame modification that decreases, neutralizes, or removes the visual trigger characteristics associated with a visual trigger profile. Depending on the type of visual trigger and characteristics thereof, there may be multiple types of frame modifications available. The visual analytics server 140 may select one or more of the frame modifications to apply to particular frame or set of frames identified as including the visual trigger. In some embodiments, the user may select a preferred type or types of modifications. The modified frame or set of frames may thereafter be provided to the user device for display within the audiovisual stream in place of the original (unmodified frames). As such, the user of the user device may experience as much of the original audiovisual stream as possible while avoiding visual triggers contained within a frame or set of frames.

In some embodiments, visual analytics server 140 may generate and develop new visual trigger profiles for different types of visual sensitivities, as well as for different content titles. Generating a visual trigger profile may include monitoring frames of an audiovisual stream associated with a specific content title for visual characteristics and providing an interface by which a user may easily and efficiently report when they are experiencing adverse effects. For example, users may flag certain scenes as having caused nausea, migraines, and eye strain. The frames associated with timestamps within a certain range from the point when the flag was received may be identified and subject to further automated analysis. The visual analytics server 140 may evaluate the flagged scene (e.g., using computer vision, visual trigger models) and related metadata to identify that portions of the flagged scene included bright, flashing lights characterized by certain color values and rapid changes thereof.

Visual analytics server 140 may further generate statistics and metrics regarding recurring visual characteristics associated with scenes flagged and reported by users as triggering certain symptoms or conditions. Such statistics and metrics may also be used to generate the visual trigger profile. Visual analytics server 140 may further generate a visual trigger timeline for a specific digital content title, which may identify a scene corresponding to a timestamp range during which one or more frames have been identified as exhibit visual characteristics at threshold or near-threshold levels. In addition, visual analytics server 140 may also generate a visual trigger heatmap of virtual locations within a virtual environment of the specific digital content title, whereby the identified virtual locations have been identified as exhibiting visual characteristics at threshold or near-threshold levels. Such timelines and heatmaps may also identify how many times a scene has been flagged or reported, as well as the specific visual sensitivities associated with each flag or report.

Over time, visual analytics server 140 may also track data regarding the type, frequency, and severity of adverse reactions across different users in response to different types of visual characteristics of different digital content titles, including after different modifications are applied. Such tracked data may be used by visual analytics server 140 to make predictions as to whether a new scene or digital content title is likely to include visual triggers, as well as make recommendations as to specific modifications that may be most effective in avoiding the same while maintaining an immersive and enjoyable user experience.

The user device 150 may include a plurality of different types of computing devices known in the art. The user device 150 may be a computing device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory including buffer memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants (e.g., players) or other types (e.g., spectators) of users in relation to a collection of digital content streams. In some embodiments, the user device 150 may include or operate with one or more display devices—such as a television, monitors, display screens, projectors, head-mounted displays, and the like— to present audiovisual streaming data associated with the digital content title being played during the interactive session. Where an audiovisual stream may be monitored and modified, the modified frame(s) may be presented in place of the original frame(s) during the stream presentation on the display device(s) of the user device.

Figure 2:
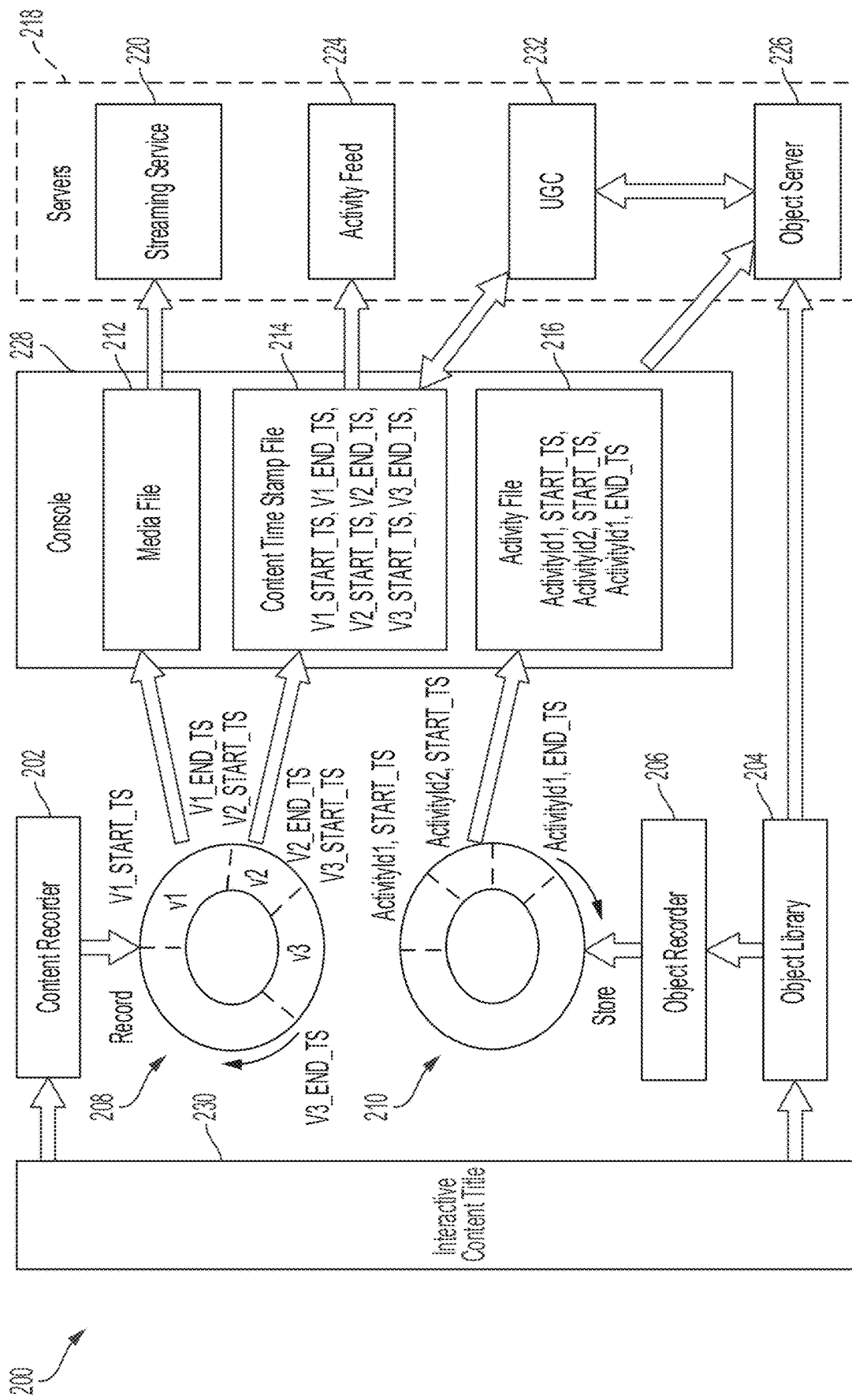
FIG. 2 illustrates an exemplary uniform data system (UDS) that may be used to provide data to a system for automated visual trigger profiling and detection within virtual environments.

FIG. 2 illustrates an exemplary uniform data system (UDS) that may be used to provide data to a system for automated visual trigger profiling and detection within virtual environments. Based on data provided by UDS 200, visual analytics server 140 can be made aware of the current session conditions, e.g., digital content title, what virtual (e.g., in-game) objects, entities, activities, and events that users have engaged with, and thus support analysis of and coordination of automated visual trigger profiling and detection by visual analytics server 140 with current virtual interactive and/or in-game activities. Each user interaction within a virtual environment may be associated the metadata for the type of virtual interaction, location within the virtual environment, and point in time within a virtual world timeline, as well as other players, objects, entities, etc., involved. Thus, metadata can be tracked for any of the variety of user interactions that can occur in during a current interactive session, including associated virtual activities, entities, settings, outcomes, actions, effects, locations, and character stats. Such data may further be aggregated, applied to data models, and subject to analytics. Such a UDS data model may be used to assign contextual information to each portion of information in a unified way across digital content and/or game titles.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC.

As illustrated in FIG. 2, an exemplary console 228 (e.g., a user device 150) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 150. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 150.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 150.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 150. In another example, an object file 216 and a content time stamp file 214 may be associated by the console 228 during creation of each file 216, 214.

In exemplary embodiments, the media files 212 and activity files 216 may provide information to visual analytics server 140 regarding current session conditions, which may also be used as another basis for evaluating incoming and buffered frames of audiovisual streams and for applying modifications thereto. Visual analytics server 140 may therefore use such media files 212 and activity files 216 to identify specific conditions of the current session, including data regarding the user, similar users, content title, content genre, etc. Based on such files 212 and 216, for example, visual analytics server 140 may identify a relevant visual trigger profile associated with the user and content title, virtual environment, virtual scene or in-game event (e.g., significant battles), which may be used to predict which visual triggers and associated characteristics may be present in upcoming frames being buffered for the current session. Such session conditions may drive how the frame(s) or portions thereof may be modified, thereby resulting in customized determinations as to whether and which modifications are applied where and to what extent. Media files 212 and activity files 216 may also be part of or serve as learning or training models for new visual triggers, what visual characteristics and levels thereof are associated with the same, what modifications may best alleviate, decrease intensity or severity, neutralize, or remove the same, etc.

Figure 3A:
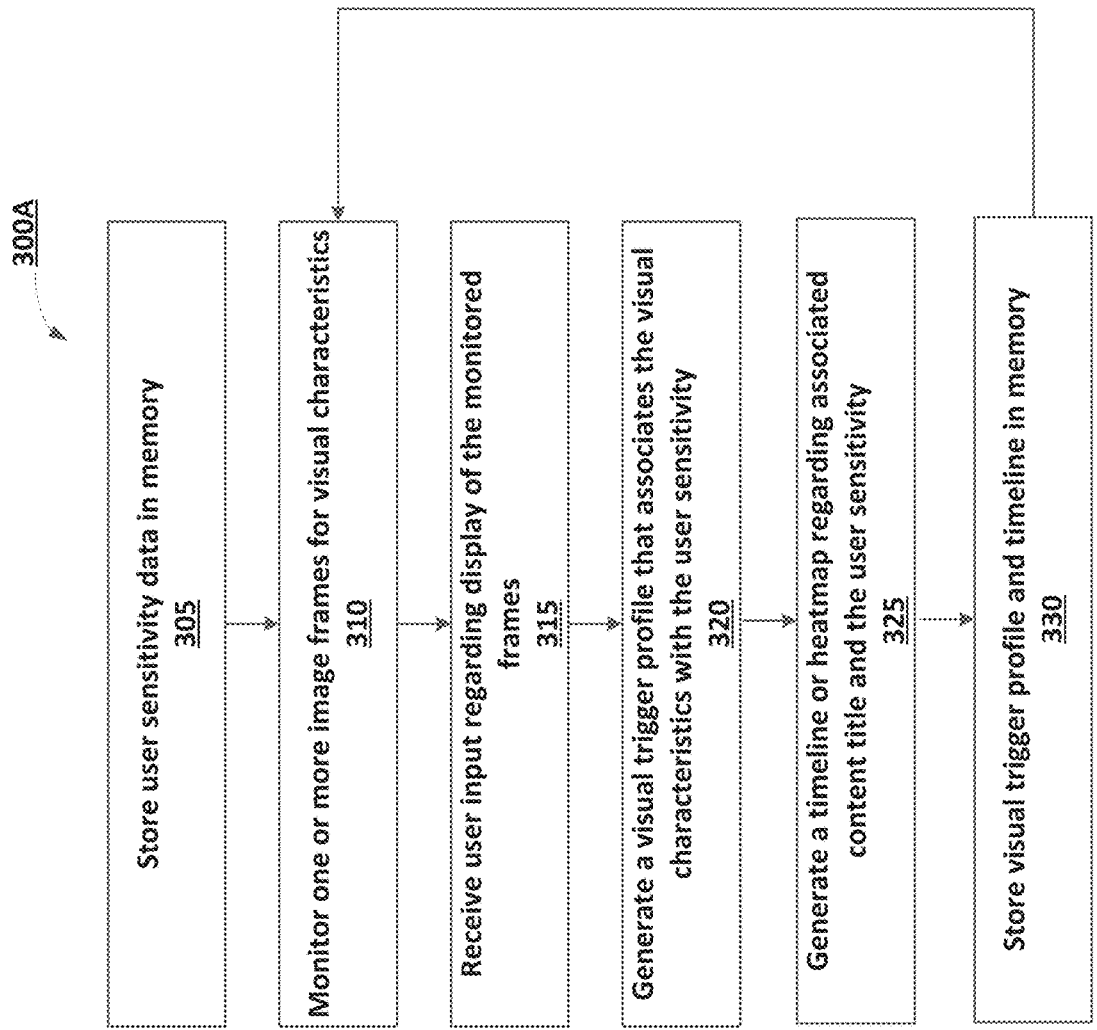
FIG. 3A is a flowchart illustrating an exemplary method for automated visual trigger profiling within virtual environments.
Figure 3B:
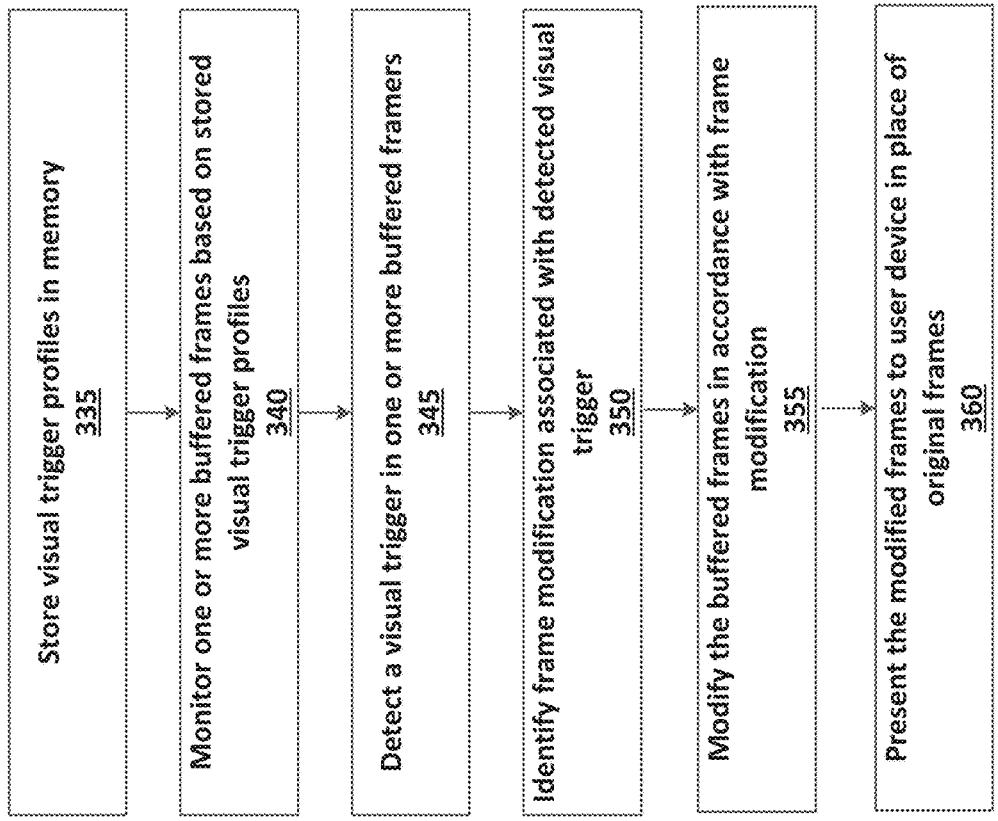
FIG. 3B is a flowchart illustrating an exemplary method for automated visual trigger detection within virtual environments

FIG. 3A is a flowchart illustrating an exemplary method 300A for automated visual trigger profiling within virtual environments, and FIG. 3B is a flowchart illustrating an exemplary method 300B for automated visual trigger detection within virtual environments. The methods 300A-B of FIGS. 3A-B may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIGS. 3A-B (and the order thereof) are exemplary and may include various alternatives, equivalents, or derivations thereof including but not limited to the order of execution of the same.

In step 305, user sensitivity data may be stored in memory. A user profile, for example, may include data regarding any known visual sensitivities of the associated user. Such visual sensitivities may be expressly reported by the user or otherwise determined based on behaviors and reactions to different visual characteristics during interactive sessions with digital content. In some implementations, the user device 150 or virtual environment may include interface features that allow the user to easily flag and/or report when they are experiencing adverse effects during an interactive session. For example, a specifically mapped button may trigger display of a reporting window, which may provide prompts regarding details of the sensitivity or scene and fields for entering answers to the same. Where a user may indicate that they have experienced or are concerned about adverse effects based on visual triggers, visual analytics server 140 may store such data in a user profile.

In step 310, one or more image frames may be monitored for visual characteristics, and in step 315, user input may be received indicating that a subset of the monitored frames is associated with an adverse reaction or potentially adverse reaction. A session timestamp may indicate when the user input was entered by the user during the interactive session. The visual analytics server 140 may compare the timestamp of the user input to timestamps associated with the audiovisual stream to identify the subset of frames associated with timestamps within a predetermined range. The visual characteristics identified in step 310 for the subset of frames identified in step 315 may therefore be used to generate a visual trigger profile in step 320.

The visual trigger profile generated in step 320 may include a set of the identified visual characteristics in association with the visual sensitivity. Analytical data regarding the visual characteristics (e.g., color value and other measurements, differentials, number of flags/reports, severity of adverse effects, etc.) may be used to set a threshold for the visual sensitivity. Multiple different thresholds (e.g., severe, medium, mild effects) may be set for different grouping of the visual characteristics and/or associated with different groups of users (e.g., highly, medium, mildly sensitive). The visual profile may be specific to certain content titles (or genres), sensitivity levels and types, user, user groups, etc. In some embodiments, a new user may develop or further customize a visual trigger profile by specifying their specific sensitivities, personal preferences, and priorities in relation to different visual effects and characteristics across different display devices and content titles. In some implementations, visual analytics server 140 may query the new user in order to identify how to generate the visual trigger profile for the user. Users may also opt to customize existing visual trigger profiles based on their own personal sensitivities, tolerances, and preferences, which may be shared with other users for use in implementing automated visual trigger detection and stream modification.

In step 325, a timeline or heatmap may be generated based on visual trigger data tracked for multiple users over multiple interactive sessions related to a same or similar (e.g., related) content title. A timeline may assess scenes, events, and activities known to occur within an associated virtual environment during an interactive session. Visual analytics server 140 may identify timestamps (or ranges thereof) within the timeline associated with frames exhibiting triggering characteristics. Such timestamps (and associated number of flags/reports) may be visually marked within a display of the timeline, so that users new to the content title may know what to expect at certain scenes. Such timeline may also be used to visual analytics server 140 to generate notifications to the user, as well as generate options for navigating such scenes (e.g., skipping, censoring, filtering in whole or in part). Similarly, a heatmap may assess different virtual locations within the virtual environment, thereby providing warning to users who may choose to avoid such locations or to request or approve a modification to the same. Such timelines and heatmaps may also be stored in one or more visual trigger profiles.

In steps 330 (end of method 300A) and 335 (beginning of method 300B), visual trigger profiles may be stored in memory (e.g., databases 160). As noted above, visual trigger profiles may be shared among different users and devices, thereby allowing users to download to a local memory device or otherwise access from a remote database 160 as needed. The stored visual trigger profiles may be refined and customized over time as more is learned about user sensitivities and associated visual characteristics of virtual environments that may cause adverse health effects. In some implementations, the visual trigger profiles may include audio analyses and associations with visual characteristics, which may be triggering to individuals that are sensitive to sensory overload. The visual trigger profile may further be used in conjunction with parental controls to censor certain types of visuals relating to adult content, such as drugs, nudity, sexual images and video, guns, text-based profanity, etc. Where user devices 150 may include biometric sensors, biometric data may also be considered as user feedback or input in conjunction with triggered sensitivities.

In step 340, buffered frames of an incoming audiovisual streams may be monitored by visual analytics server 140. A user using user devices 150 to stream and play digital interactive content (e.g., video game) in a current session may be presented with an audiovisual stream displaying a virtual environment. Visual analytics server 140 may identify that a subset of the buffered frames or portions thereof include visual characteristics that meet a threshold of an applicable visual trigger profile in step 345.

In step 350, one or more frame modifications associated with the visual trigger profile may be identified. Such modifications may be store din the visual trigger profile, and the visual analytics server 140 may make one or more selections from among the modifications. The modifications may be selected in accordance with their respective ability to decrease, neutralize, or remove the visual characteristics associated with the visual trigger. As noted above, the modifications may include color filters, contrast filters, color conversions, censor bars, substitute images, and frozen images. The modifications may be associated with instructions executable to apply the respective modification to a specifically identified frame or portion thereof. Different frame portions or different types of visual characteristics may be subject to different modifications.

In step 355, the identified subset of the buffered frames may be modified in accordance with the modification(s) identified in step 350, and in step 360, the modified frames are presented in context of the audiovisual stream in place of the originally identified subset of buffered frames. As such, the visual triggers identified within such frames may be decreased in intensity, censored, or otherwise removed from the audiovisual stream provided to the user device 150 for display.

Figure 4A:
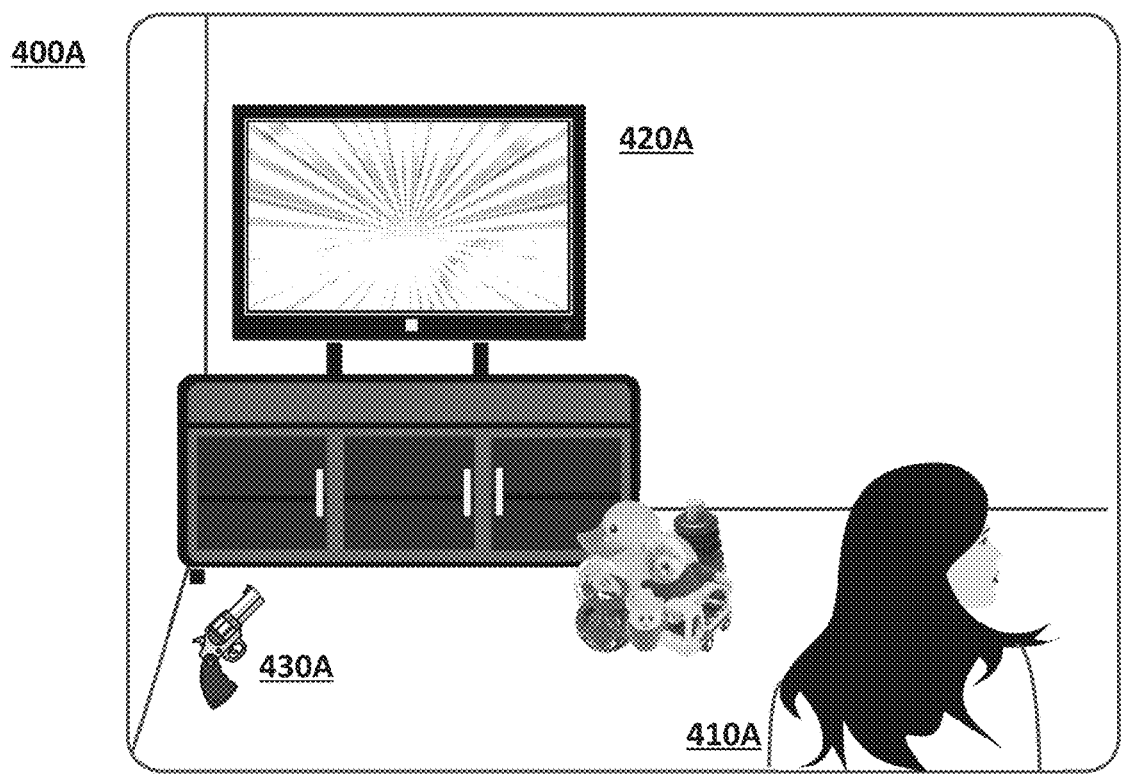
FIG. 4A illustrates an exemplary video frame that may be buffered and analyzed in accordance with automated visual trigger profiling and detection within virtual environments.
Figure 4B:
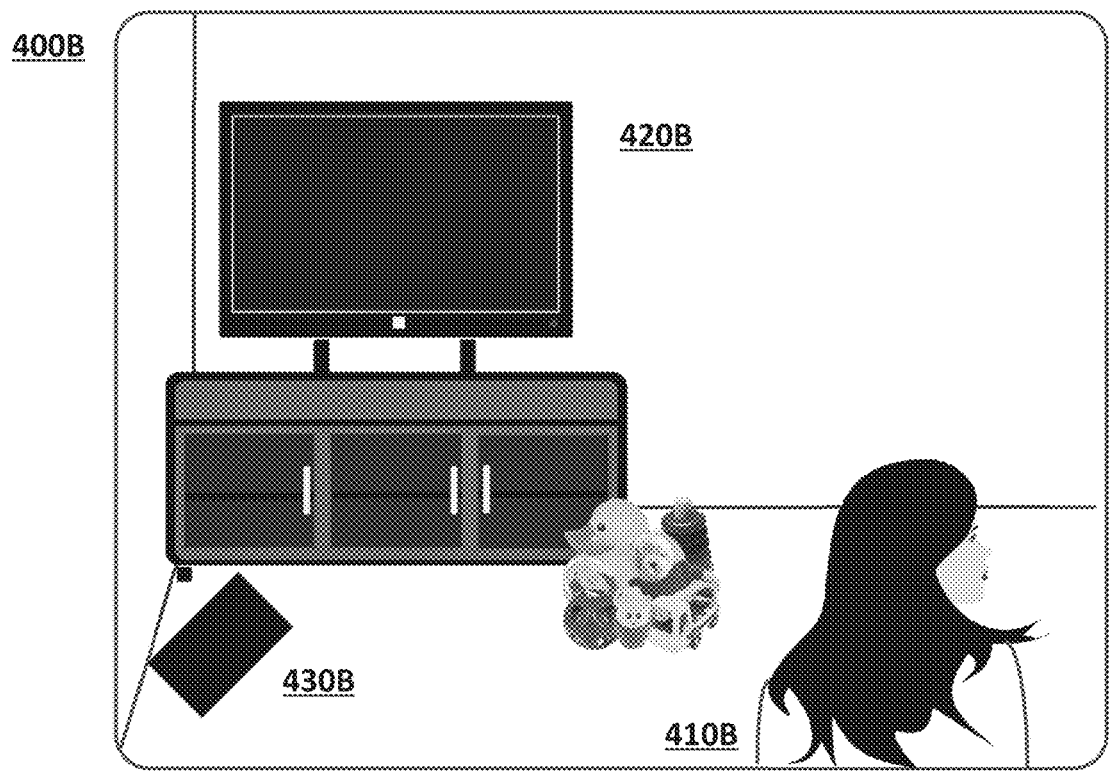
FIG. 4B illustrates the exemplary video frame of FIG. 4A that may be modified in accordance with automated visual trigger profiling and detection within virtual environments.

FIG. 4A illustrates an exemplary video frame 400A that may be buffered and analyzed in accordance with automated visual trigger profiling and detection within virtual environments, and FIG. 4B illustrates the exemplary video frame of FIG. 4A that may be modified 400B in accordance with automated visual trigger profiling and detection within virtual environments. As illustrated, video frame 400A includes a user avatar 410A in a virtual environment that includes different types of visual triggers 420A and 430A. The first visual trigger 420A may include bright, flashing lights, while visual trigger 430A may include a gun.

In an implementation where a user may be associated with a custom visual trigger profile specifying that such visual triggers be modified, visual analytics server 140 may identify that video frame 400A includes such visual triggers 420A and 430A while video frame 400A is being buffered in buffer memory. Visual analytics server 140 may therefore apply modifications to the identified visual triggers 420A and 430A within video frame 400A to generate a modified video frame 400B in which both visual triggers 420B and 430B appear blocked or redacted from the scene. As such, when video frame 400B is presented to user avatar 410B, visual triggers 420B and 430B may be hidden so as to avoid any adverse effects associated with seeing the same.

Figure 5:
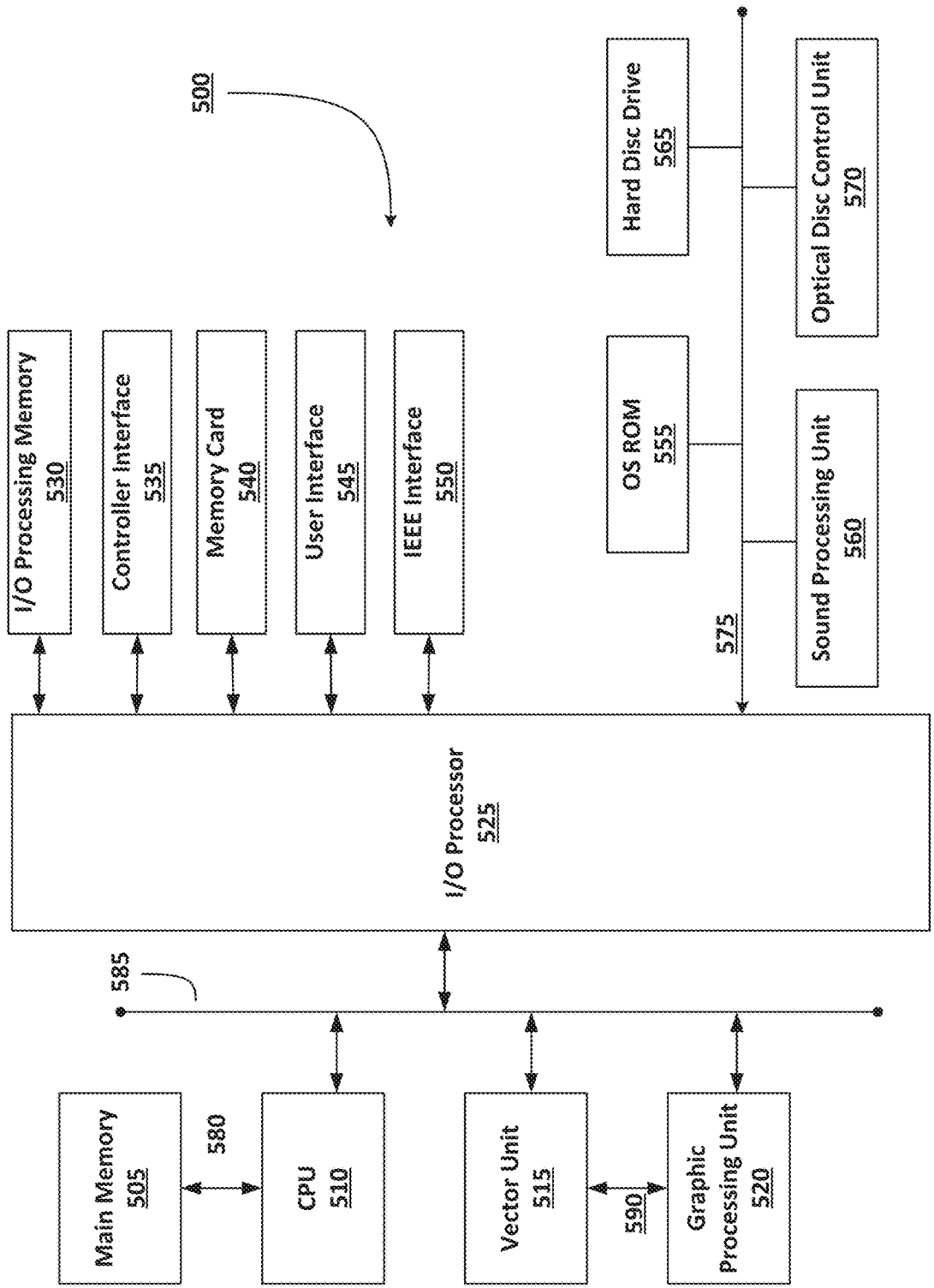
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for automated visual trigger profiling and detection within virtual environments, the method comprising:
   storing a plurality of different visual trigger profiles in memory, wherein each visual trigger profile includes a different set of visual trigger characteristics associated with audiovisual content;
   monitoring one or more buffered frames of an audiovisual stream associated with a digital content title played during a current interactive session of a user engaged in one or more activities in a virtual environment, wherein the buffered frames have not yet been displayed on a display device of the user;
   determining that one or more current session conditions in the virtual environment of the digital content title are indicative of one or more virtual events occurring during the current interactive session;
   identifying a relevant visual trigger profile associated with the digital content title from among the plurality of different visual trigger profiles based on the current session conditions and game activity data of other users identified as similar to the user under similar conditions;
   predicting that upcoming frames of the audiovisual stream are likely to include at least one of the visual trigger characteristics that meets a threshold level of the visual trigger characteristics based on the one or more virtual events indicated by the current session conditions, wherein the threshold level is defined in accordance with the relevant visual trigger profile associated with the other users identified as similar to the user;
   identifying a frame modification that decreases the level of the at least one predicted visual trigger characteristic based on the relevant visual trigger profile and the current session conditions; and
   applying the frame modification to the one or more buffered frames, wherein the modified frames are presented during the audiovisual stream in place of the one or more buffered frames.

2. The method of claim 1, wherein the relevant visual trigger profile further includes information regarding one or more associated frame modifications, and wherein the identified frame modification is selected from the one or more associated frame modifications.

3. The method of claim 1, wherein the frame modification includes at least one of a color filter, contrast filter, color conversion, censor bar, substitute image, and frozen image.

4. The method of claim 1, further comprising generating the relevant visual trigger profile.

5. The method of claim 4, wherein generating the relevant visual trigger profile includes:
   monitoring one or more frames of one or more audiovisual streams for visual characteristics;
   receiving user input indicating that one or more of the monitored frames are associated with a visual sensitivity during display of the indicated frames; and
   storing data in the relevant visual trigger profile regarding the visual characteristics of the monitored frames in association with the visual sensitivity.

6. The method of claim 1, further comprising generating a timeline of the digital content title based on the relevant visual trigger profile, wherein the timeline includes one or more timestamp ranges of one or more frames that exhibit the visual trigger characteristics included in the relevant visual trigger profile.

7. The method of claim 1, further comprising generating a heatmap of the digital content title based on the relevant visual trigger profile, wherein the heatmap includes one or more virtual locations within the virtual environment of the digital content title that are associated with the visual trigger characteristics included in the relevant visual trigger profile.

8. The method of claim 1, wherein a different one of the plurality of visual trigger profiles includes a set of visual trigger characteristics associated with a different type of visual sensitivity than the relevant visual trigger profile.

9. The method of claim 1, wherein the plurality of different visual trigger profiles are accessible to a plurality of user devices over a communication network.

10. The method of claim 1, further comprising customizing the relevant visual trigger profile to the user, wherein customizing the relevant visual trigger profile to the user includes adjusting at least one of the threshold level, the visual trigger characteristics in the set, and one or more preferences for frame modification.

11. The method of claim 1, wherein the other users are identified as similar to the user based on respective adverse reactions to the same visual trigger characteristics.

12. The method of claim 1, further comprising receiving the game activity data of the other users from an object server communicatively connected to a device of the user.

13. A system for automated visual trigger profiling and detection within virtual environments, the system comprising:
   memory that stores a plurality of different visual trigger profiles, wherein each visual trigger profile includes a different set of visual trigger characteristics associated with audiovisual content;
   a communication interface that communicates over a communication network to receive an audiovisual stream associated with a digital content title played during a current interactive session of a user engaged in one or more activities in a virtual environment; and
   a processor that executes instructions stored in memory, wherein the processor executes the instructions to:
      monitor one or more buffered frames of the audiovisual stream, wherein the buffered frames have not yet been displayed on a display device of the user;
      determine that one or more current session conditions in the virtual environment of the digital content title are indicative of one or more virtual events occurring during the current interactive session;

identify a relevant visual trigger profile associated with the digital content title from among the plurality of different visual trigger profiles based on the current session conditions and game activity data of other users identified as similar to the user under similar conditions;

predict that upcoming frames of the audiovisual stream are likely to include at least one of the visual trigger characteristics that meets a threshold level of the visual trigger characteristics based on the one or more virtual events indicated by the current session conditions, wherein the threshold level is defined in accordance with the relevant visual trigger profile associated with the other users identified as similar to the user;

identify a frame modification that decreases the level of the at least one predicted visual trigger characteristic based on the relevant visual trigger profile and the current session conditions; and apply the frame modification to the one or more buffered frames, wherein the modified frames are presented during the audiovisual stream in place of the one or more buffered frames.

14. The system of claim 13, wherein the relevant visual trigger profile further includes information regarding one or more associated frame modifications, and wherein the identified frame modification is selected from the one or more associated frame modifications.

15. The system of claim 13, wherein the frame modification includes at least one of a color filter, contrast filter, color conversion, censor bar, substitute image, and frozen image.

16. The system of claim 13, wherein the processor executes further instructions to generate the relevant visual trigger profile.

17. The system of claim 16, wherein the processor generates the relevant visual trigger profile by:
  monitoring one or more frames of one or more audiovisual streams for visual characteristics;
  receiving user input indicating that one or more of the monitored frames are associated with a visual sensitivity during display of the indicated frames; and
  storing data in the relevant visual trigger profile regarding the visual characteristics of the monitored frames in association with the visual sensitivity.

18. The system of claim 13, wherein the processor executes further instructions to generate a timeline of the digital content title based on the relevant visual trigger profile, wherein the timeline includes one or more timestamp ranges of one or more frames that exhibit the visual trigger characteristics included in the relevant visual trigger profile.

19. The system of claim 13, wherein the processor executes further instructions to generate a heatmap of the digital content title based on the relevant visual trigger profile, wherein the heatmap includes one or more virtual locations within the virtual environment of the digital content title that are associated with the visual trigger characteristics included in the relevant visual trigger profile.

20. The system of claim 13, wherein a different one of the plurality of visual trigger profiles includes a set of visual trigger characteristics associated with a different type of visual sensitivity than the relevant visual trigger profile.

21. The system of claim 13, wherein the plurality of different visual trigger profiles are accessible to a plurality of user devices over the communication network.

22. The system of claim 13, wherein the processor executes further instructions to customize the relevant visual trigger profile to the user, wherein customizing the visual trigger profile to the user includes adjusting at least one of the threshold level, the visual trigger characteristics in the set, and one or more preferences for frame modification.

23. A non-transitory, computer-readable storage medium, having embodied thereon a program executable by a processor to perform a method for automated visual trigger profiling and detection within virtual environments, the method comprising:
  storing a plurality of different visual trigger profiles in memory, wherein each visual trigger profile includes a different set of visual trigger characteristics associated with audiovisual content;
  monitoring one or more buffered frames of an audiovisual stream associated with a digital content title played during a current interactive session of a user engaged in one or more activities in a virtual environment, wherein the buffered frames have not yet been displayed on a display device of the user;
  determining that one or more current session conditions in the virtual environment of the digital content title are indicative of one or more virtual events occurring during the current interactive session;
  identifying a relevant visual trigger profile associated with the digital content title from among the plurality of different visual trigger profiles based on the current session conditions and game activity data of other users identified as similar to the user under similar conditions;
  predicting that upcoming frames of the audiovisual stream are likely to include at least one of the visual trigger characteristics that meets a threshold level of the visual trigger characteristics based on the one or more virtual events indicated by the current session conditions, wherein the threshold level is defined in accordance with the relevant visual trigger profile associated with the other users identified as similar to the user;
  identifying a frame modification that decreases the level of the at least one predicted visual trigger characteristic based on the relevant visual trigger profile and the current session conditions; and
  applying the frame modification to the one or more buffered frames, wherein the modified frames are presented during the audiovisual stream in place of the one or more buffered frames.

* * * * *